Nov. 4, 1952     R. E. RISSER, JR     2,616,293
OPERATING MECHANISM FOR FLUID METERS
Filed Aug. 17, 1946     5 Sheets-Sheet 2

Fig. 2

Inventor:
Ross Eugene Risser, Jr.
By Hinkle, Horton, Ellsberg, Hausmann & Wupper
Attorneys

Patented Nov. 4, 1952

2,616,293

UNITED STATES PATENT OFFICE 2,616,293

OPERATING MECHANISM FOR FLUID METERS

Ross Eugene Risser, Jr., Bonham, Tex.

Application August 17, 1946, Serial No. 691,248

10 Claims. (Cl. 73—244)

1

The present invention relates to a fluid meter of the type which is adapted to be used in automotive service station dispensing equipment or the like and more particularly to an improved construction and arrangement of distributing valve, valve operating means and register driving mechanism.

In the gasoline dispensing equipment commonly found in service stations, gasoline is pumped under pressure from a storage tank to a displacement meter which discharges into a pipe line leading to a flexible hose and nozzle used in such installations for conveying gasoline from the pipe line to the receptacle being filled. The displacement meter ordinarily includes a plurality of pistons reciprocated in cylinders by the pressure of the incoming gasoline and these cylinders discharge into ports and ducts communicating with a discharge passageway in the meter connected to the delivery pipe line of the system. A distributing valve driven by these pistons through the intermediary of a valve operating plate controls the flow of gasoline discharged from the cylinders in such a manner that the incoming gasoline exerts a driving force on the pistons in sequence so that the pistons are reciprocated and the valve-operating plate and valve are operated. Operation of these pistons forces gasoline into the discharge passageway of the meter and from this passageway into the delivery pipe line and the flexible hose and nozzle.

In one form of meter the distributing valve is driven by the pistons through the intermediary of a valve-operating plate, and the valve in turn is operatively connected to and drives a register which visually indicates the volume of gasoline dispensed and quite frequently the cost of the particular volume which has been dispensed. The present invention is concerned particularly with improvements in these parts of the metering apparatus aimed at producing a better and more accurate operation thereof over a long period of time.

Accordingly, an object of the invention is the provision in a fluid meter of the type above-mentioned of an improved mounting for the valve and valve-operating plate which permits orbital movement of the valve and plate and in addition permits slight freedom of movement thereof angularly so that the path of travel of the valve over the valve seat varies slightly from time to time and as a result the liability of the valve wearing a path on the valve seat is greatly lessened.

2

Another object of the invention is the provision of a new and improved fluid meter having a valve-operating plate and fulcrum means on this plate which engage with a stationary portion of the meter structure for insuring a positive cut-off at the top and bottom of each piston stroke without impeding orbital movement of the valve-operating plate and valve.

A further object of the invention is the provision of a new and improved fluid meter having means adapted to engage a race on the valve adjustable from the exterior of the meter housing to increase or decrease the length of stroke of the pistons and the orbital tilt of the valve.

A still further object of the invention is the provision of a new and improved fluid meter having a follower drive pin on the distributing valve and a driving cam on the register driving mechanism engaging the pin, the cam being of such configuration that it forces the valve to travel over an orbital path throughout its cycle of operation and thereby prevents short stroking of the valve so that an accurate reading on the register of the volume of liquid flowing through the meter is obtained.

Yet another object of the invention is the provision of a new and improved fluid meter having a distributing valve and valve-operating plate so constructed and arranged that the liability of wear on these parts is greatly reduced and as a result the meter remains accurate over extended periods of use.

A further object of the invention is the provision of a new and improved fluid meter of simplified and improved construction and arrangement of parts which is inexpensive to manufacture but nevertheless sufficiently sturdy to withstand long periods of use without necessitating repair or major adjustment of the parts and which may be readily adjusted or dismantled for repair.

These and other objects of the invention will become apparent from the ensuing description, reference being had to the accompanying drawings in which.

Figure 1:
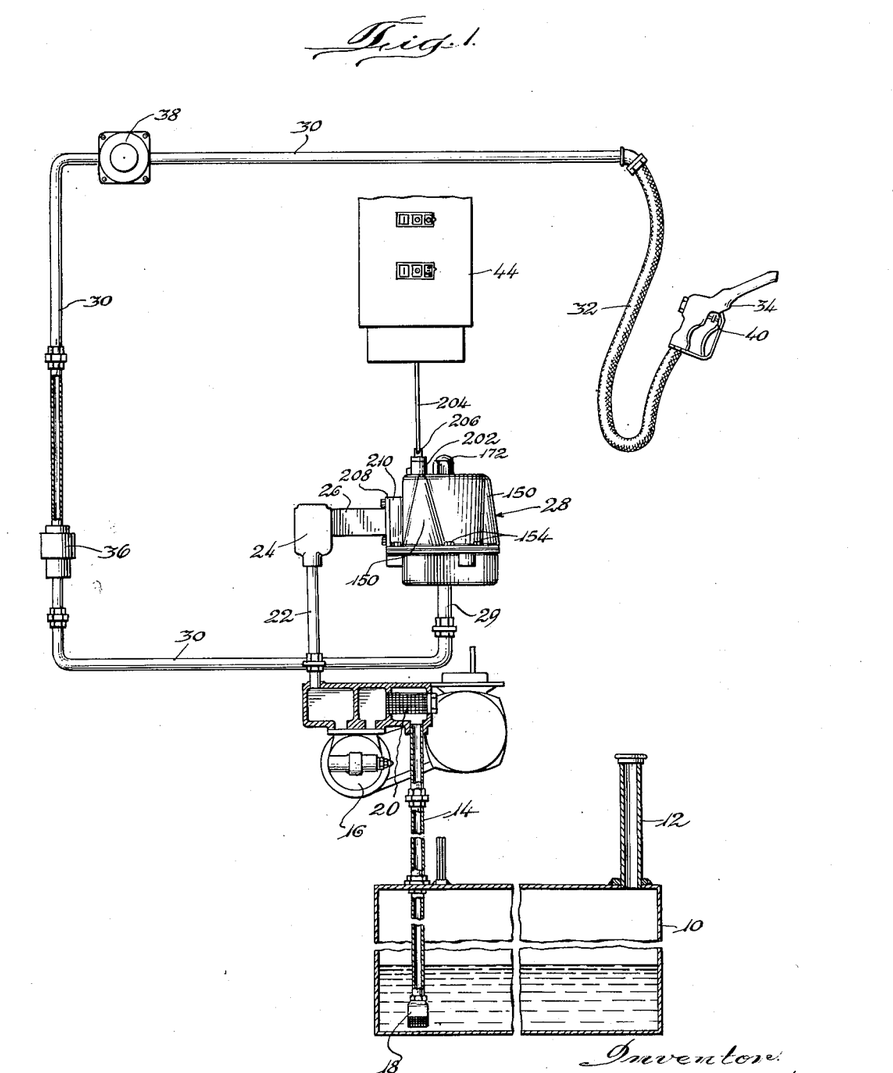
Fig. 1 is a diagrammatic representation of an arrangement of dispensing equipment particularly suitable for gasoline service stations servicing automotive vehicles.

Referring to Fig. 1, it will be noted that the dispensing equipment to which the meter of the present invention may be applied includes a subterranean gasoline storage tank 10 having a filling spout 12 through which the tank may be replenished extending to the surface and an outlet conduit 14 which extends upwardly from a point inside the tank adjacent the bottom to the inlet side of the electrically driven gear pump 16 which draws gasoline from the tank and forces it through the dispensing equipment. A foot valve 18 having a screened inlet is secured over the lower open end of the conduit 14 and a strainer 20 is secured adjacent the inlet chamber of pump 16 so that extraneous solids present in the gasoline in the storage tank are excluded from the gear pump 16 and the other parts of the dispensing equipment.

From the outlet chamber of the pump 16 gasoline is forced through a conduit 22 and an air remover 24 to the inlet manifold 26 leading to a displacement meter housing 28. Gasoline is discharged from the meter 28 through a discharge pipe 29 connected to a pipe line 30 which is in communication with a flexible hose 32 having a nozzle 34 that engages in the filling opening of the receptacle being filled. Interposed in this pipe line is a check valve 36 and a visual flow indicator 38 which has a propeller or other movable indicator mounted therein behind a transparent window in the front wall of the indicator housing. This propeller is actuated by gasoline flowing through the indicator, and the indicator is mounted in such a position that it can be observed by the purchaser so that he will know when gasoline is being dispensed. It is preferable to mount the indicator 38 at the highest point in the delivery line so that if there is any air in the system, bubbles will be visible through the transparent wall of the indicator housing as the gasoline flows therethrough.

The system herein disclosed is of the wet hose type so that it remains filled with gasoline at all times and an immediate flow from the nozzle 34 may be secured by opening a manually operated valve 40 secured therein. When it is desired to dispense gasoline the pump motor is turned on and the nozzle is inserted in the filling opening of an automotive gasoline tank or other receptacle. The instant the valve 40 is opened gasoline flows from the nozzle 34, thus releasing the pressure in the system so that more gasoline is drawn by the pump 16 from tank 10 through foot valve 18, conduit 14 and strainer 20 into the inlet chamber of the pump. From the outlet chamber of the pump, the gasoline is forced through the conduit 22, air remover 24 and manifold 26 into the displacement meter 28 connected to a visual register 44 that indicates to an observer the amount of gasoline which has been dispensed and which may be provided with an indicator to show the cost of this amount of gasoline. After passing through the meter, the gasoline is discharged through a discharge pipe 29 into the delivery pipe line 30 and flows through check valve 36, visual flow indicator 38, hose 32, nozzle 34 and into the receptacle being filled.

Referring now to Figs. 2 to 7 wherein the details of the meter are shown, it will be noted that the meter 28 comprises a base 46 which forms a cylinder block and support for the operating parts of a meter and a generally cylindrical shaped dome or cover 48, both of which are preferably cast from an aluminum alloy. The base 46 has a main body portion 50 that is generally triangular in outline as indicated in dotted lines in Fig. 5. Cast integrally therewith is a circular top plate 52 which has a machined upper surface 54. A passageway 56 located on the vertical axis of this base extends through the top plate 52 and triangular body 50 of the base and has an enlarged upper end 58 for a purpose to be described hereinafter while the lower end of the passageway is tapped, as indicated at 60 in Fig. 2, for receiving the threaded end of discharge conduit 29 which is in communication at its other end with the delivery pipe line 30 of the dispensing system shown in Fig. 1.

Integrally cast in the base 46 along a center line equidistant from its vertical axis and at intervals equally spaced from each other are three cylinder wells 62a, 62b and 62c which extend vertically downwardly through the top plate 52 and into the triangular portion 50 of the base. These wells form the cylinders in which the pistons of a meter operating mechanism reciprocate; hence, the cylindrical walls 64 thereof are machined so that the pistons will snugly engage these walls and leaking from one side of the pistons to the other will be prevented.

While a base having three cylinders has been disclosed herein, it is to be understood that the number of cylinders can be increased if a meter operating mechanism having more than that number of pistons is to be used. In such a case, the main body 50 of the base will have to be made square or round in outline to provide the necessary space for the increased number of cylinder wells.

In addition to the vertical passageway 56 and cylinder wells 62a, 62b and 62c, the base 46 is also provided with three ducts, 66a, 66b and 66c, formed in the space between the wells. The upper ends of these ducts terminate in ports 68a, 68b and 68c, respectively, in the top surface 54. At their bottom ends, each of these ducts communicates with the bottom of that cylinder well which is located to the right of the duct, as shown at 69a, 69b and 69c, respectively, in Fig. 5 which also shows the ports 69a, 69b and 68c in top plate 54.

Seated upon the top plate 52 of the base 46 centrally thereof is the meter operating mechanism which is suspended from a tubular column 70 capped by a semi-spherical head forming a valve seat 72 and is supported on a generally triangular-shaped base 74, both cast integrally with the column. This casting may be formed from any suitable metal such as bronze and the semi-spherical valve seat 72 is preferably plated with chromium or some other hard metal which has good wear-resisting properties. An arm 76 tapers outwardly from each apex of the base 74 and terminates in a flange 78 which has a vertical aperture 80 therein.

Figure 4:
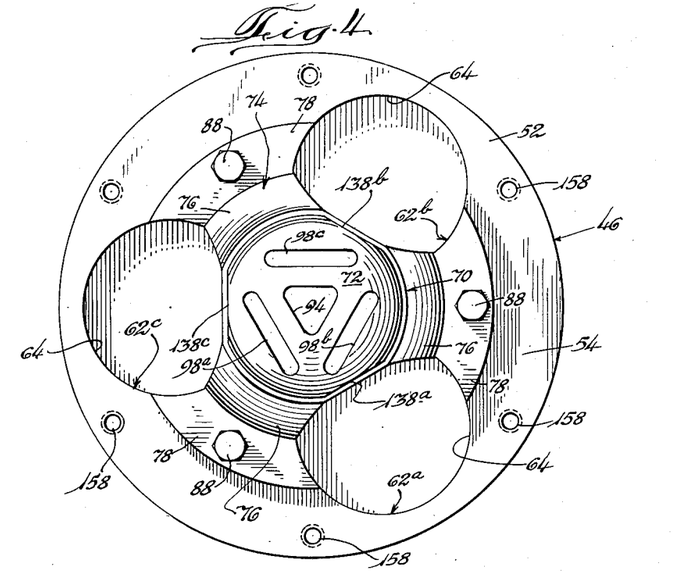
Fig. 4 is a top plan view of the base of the meter housing with the dome-shaped valve seat in position thereon and the distributing valve, valve-operating plate and pistons removed.
Figure 5:
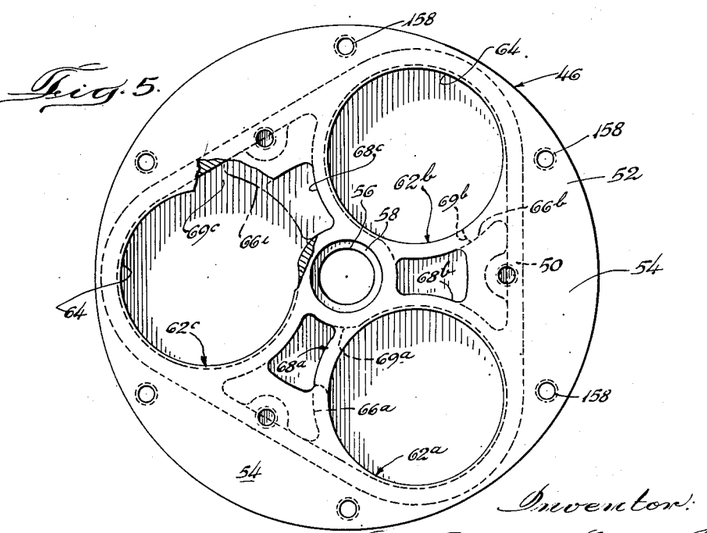
Fig. 5 is a top plan view partly in section of the base of the meter housing with the valve seat and operating mechanism of the meter removed therefrom.

This triangular-shaped base 74 has a flat bottom 82 which rests on the top plate 52 of base 46 and is provided with a central tubular nipple 84 which projects into the enlarged upper end 58 of the passageway 56 in the base 46, while the arms 76 and flanges 78 extend outwardly on the top plate 52 over the space between the cylinder wells 62a, 62b and 62c, so that the upper ends of the cylinder wells are open to the interior of the meter housing over the greater portion of their area, as indicated in Fig. 4. A gasket 86 having openings corresponding to the openings in the top plate 52 is interposed between the base 74 of the column 70 and the top plate to form a fluid tight union between these parts. Cap screws 88 which pass through the apertures 80 in flanges 78 on the arms of the column base are threaded into tapped opening 90 in the base 46 aligned with the apertures 80. By tightening down these screws the column 70 may be firmly secured to the base 46 of the housing 28.

When the column is secured in the position above described a centrally located vertically extending passageway 92 therein is in alignment with the passageways 56 in the base 46 in which the discharge conduit 29 of the meter is secured. Communication through the valve seat 72 to this passageway 92 is established through a triangular-shaped port 94 centrally located in the valve seat 72 on the column 70. This port 94 along with the communicating passageways 92 and 56 forms the discharge outlet of the meter housing.

In addition to the passageway 92 the column 70 is provided with three vertically extending ducts 96a, 96b and 96c terminating at their upper ends in elongated ports 98a, 98b and 98c, respectively, in the valve seat 72. These ports have side edges that are spaced from and extend generally parallel with the sides of the triangular port 94 and the ports are of such length that their ends extend to a line that might be drawn extending from the edges of the port 94 coincidentally therewith, as seen in Fig. 4.

The lower ends of ducts 96a, 96b and 96c diverge outwardly in the arms 76 on the base 74 of the column and communicate with the ports 68a, 68b and 68c, respectively, in the top 52 of the base 46, which latter ports communicate with the bottoms of the cylinder wells 62a, 62b and 62c in a manner previously described. It will be observed that a direct passageway from the bottom of each cylinder well to that port in the valve seat 72 on its left is thus formed, this passageway being, for example, through opening 69a, duct 66a, port 68a, duct 96a and port 98a. Fluid may flow in either direction through these passageways, the direction of flow being controlled by a distributing valve, valve-operating plate and meter-driving mechanism now to be described.

Referring now to Figs. 2, 3, 6 and 7, it will be seen that the mechanism for driving the valve-operating plate and valve is a three-cylinder fluid motor having piston rods connected to the plate which is ring-shaped. A driving force is imparted to this plate by the pistons, and movement of the plate is imparted directly to the valve. This valve and operating plate are formed from a single bronze casting having a distributing valve 100 of the general shape of an equilateral triangle in outline which is machined as described below. From this valve a ring-shaped operating plate 102 is suspended in a horizontal plane by means of arms 104 which arch outwardly and downwardly from the apexes of the valve 100 and merge with the top surface of the ring 102. The ring and valve are both on the same vertical axis and the inner diameter of the plate is great enough to permit the plate to be suspended in spaced encircling relation with the column 70.

Valve 100 is provided with an equilateral triangular-shaped valve chamber 106 cast in its bottom side. This chamber has side walls 108 of approximately the same thickness as the width of the elongated ports 98a, 98b and 98c in the head of column 70. The bottom edges 110 on these side walls are carefully machined to correspond with the contour of the semi-spherical seat 72 so that these edges closely engage the seat when the valve is seated thereon, and the side walls are of sufficient length to cover completely each of the elongated ports when the valve is properly positioned at dead center. Each of the vertical axes of this triangular chamber 106 measured from any apex of the chamber to the inner surface of the side wall opposite that apex is of a length substantially equal to the distance from any apex of the triangular port 94 to the outer edge of the elongated port 98a, 98b or 98c oppositely disposed to that apex on a line normal to the plane of the back edge of that port 98a, 98b or 98c. This construction permits each of the elongated ports to be brought into communication singly with the triangular discharge port 94 and through this port with the discharge passageway extending through the column and base of the housing merely by progressively tilting the valve 100 to the proper extent around the seat 72 so that the valve moves on the head with a motion similar to the familiar precessional motion of a top or gyroscope.

When the valve is moved in this manner the discharge side of the meter is brought into communication successively with each of the ports 98a, 98b and 98c and through these ports, respectively, to ducts 96a, 96b and 96c, ports 68a, 68b and 68c, ducts 66a, 66b and 66c, and openings 69a, 69b and 69c communicating with the bottom of the cylinder wells 62a, 62b and 62c. At the same time the elongated port removed in a clockwise direction from the port which is in communication with the triangular discharge port 94 will be closed by one of the bottom edges 100 of the valve 100 and that elongated port removed in the counterclockwise direction will be open to the incoming gasoline flowing into the meter housing so that its associated cylinder will be in communication with incoming gasoline at both its ends.

Figure 7:
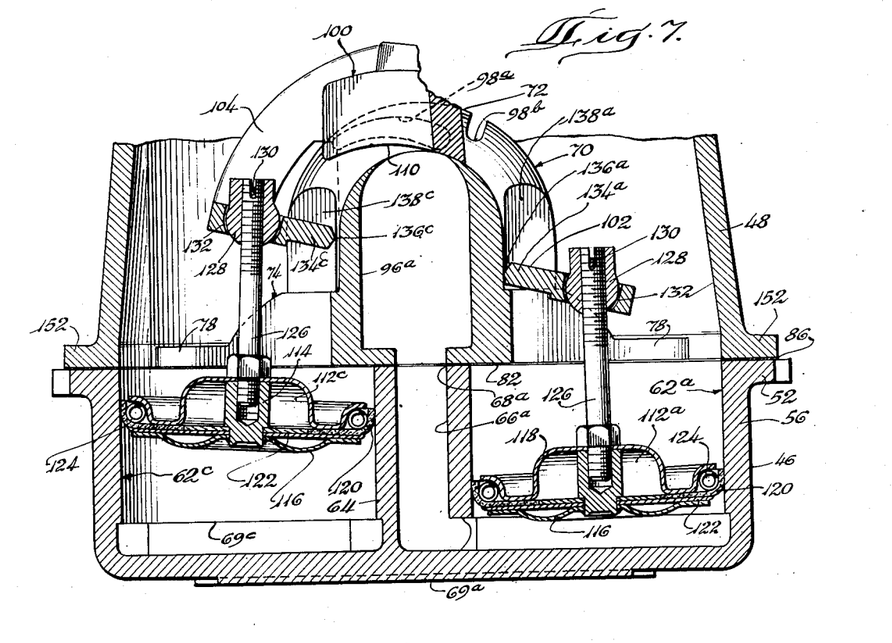
Fig. 7 is a fragmentary sectional view taken on the line 7—7 of Fig. 3 showing two pistons of the meter operating mechanism at opposite extremes in their stroke.

A downwardly directed force is exerted on the valve operating plate 102 in sequence by each of the pistons 112a, 112b and 112c, which reciprocate vertically in the cylinder wells 62a, 62b and 62c, respectively, as indicated in Fig. 7, and this force is communicated to the valve 100 by the plate 102. Each of these pistons is provided with a head having a hub 114 upon which a metal backing plate 116 and a metal head plate 118 are secured. A leather cup washer 120 and cup washer supporting plate 122 are secured between the head and backing plates. The leather cup washer 120 is urged outwardly against the cylinder walls 64 by means of an annular coil spring 124 underlying the inner face of the cup washer and maintained in position by the flanged edge of the head plate of the piston. Thus, substantially leak-proof contact is secured between the piston and the cylinder walls 64.

A piston rod 126 is secured to the hub 14 of each piston and is provided with a threaded upper end upon which a ball fitting 128 is screwed. These fittings have a castellated head which receives a cotter pin 130 that extends through a transverse aperture adjacent the upper end of the piston rods for locking the fittings at a desired position of adjustment on the piston rods.

The ball fittings 128 seat in sockets 132 in the ring-like plate 102 spaced 120 degrees apart. Thus, if the value is assumed to be at dead center, the piston rods will be suspended from the ring on vertical axes and each of the pistons will be at the mid-point in its stroke. Since the only operating force on the piston heads is directed downwardly the ball fittings 128 do not have to be secured in the ring but merely seat in the sockets 132. It will be apparent that the effective length of the piston rod 126 may be varied by removing cotter pin 130 and screwing the ball fitting up or down on the piston rod and then replacing the cotter pin to lock the ball fitting in the new position of adjustment.

Figure 3:
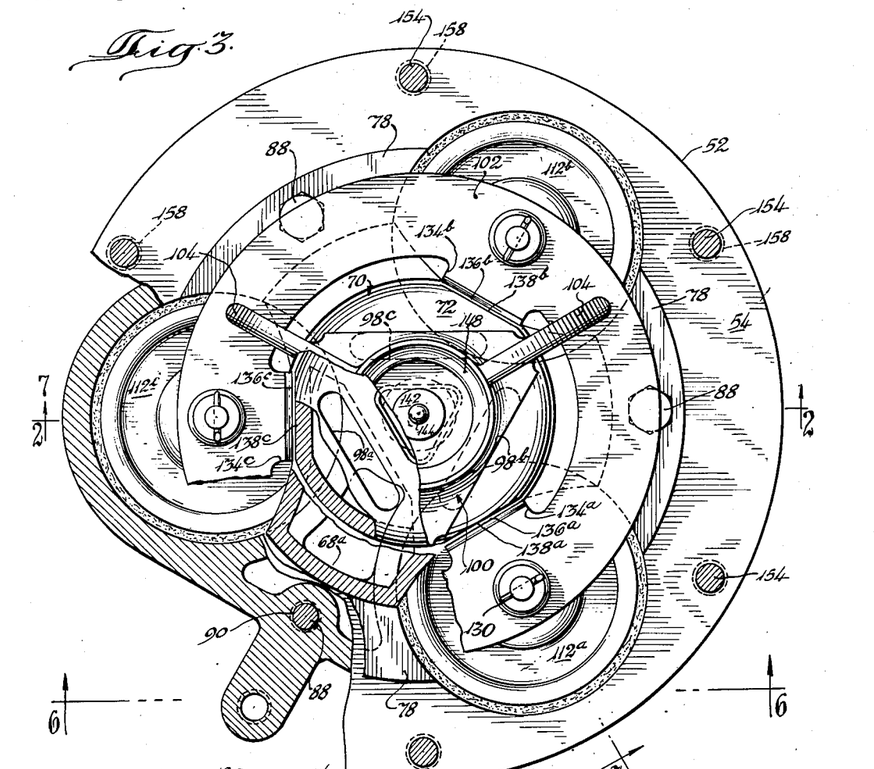
Fig. 3 is a top plan view, partly in section, of the improved fluid meter of the present invention with the cover of the meter housing removed to more clearly disclose the operating mechanism of the meter.

In Figs. 3 and 7 is shown the means for positively cutting off each stroke of the pistons when they reach their bottom limit. On these figures it will be noted that along the inner edge of plate 102 opposite each of the sockets 132 is an inwardly projecting boss, these bosses being numbered 134a, 134b and 134c. The inner faces of these bosses are convergingly tapered to form fulcrum edges 136a, 136b and 136c, respectively. At the dead center position of the valve and plate these edges are spaced a short distance from three equally spaced vertically extending plane surfaces 138a, 138b and 138c on the sides of column 70 over the cylinder well 62a, 62b and 62c, respectively. When the meter is operating, the fulcrum edge over that piston which is approaching the bottom of its stroke will engage the flat surface above that piston and thereby cut off further downward tilting of the plate 102 and valve 100 by the piston so that the stroke of the piston is also cut off. In the ordinary operation of the meter the fulcrum edge above that piston which is at the top of its stroke will also be engaged with one of the plane surfaces. A distinct advantage results from this particular cut-off means and its arrangement because the plate 102 and valve 100 are free to pivot slightly on these edges at the end of each stroke of the pistons and in addition they are free to rotate slightly in an angular direction during the major portion of each stroke so that the path of travel on the valve seat 72 will vary slightly from time to time. As a result, wear on the seat as a whole is more evenly distributed and a grooved path is not worn in the seat so that the useful life of a meter of this type is greater than that of a meter in which the distributing valve travels over the same path in each cycle of its operation and its maintenance costs less.

Figure 2:
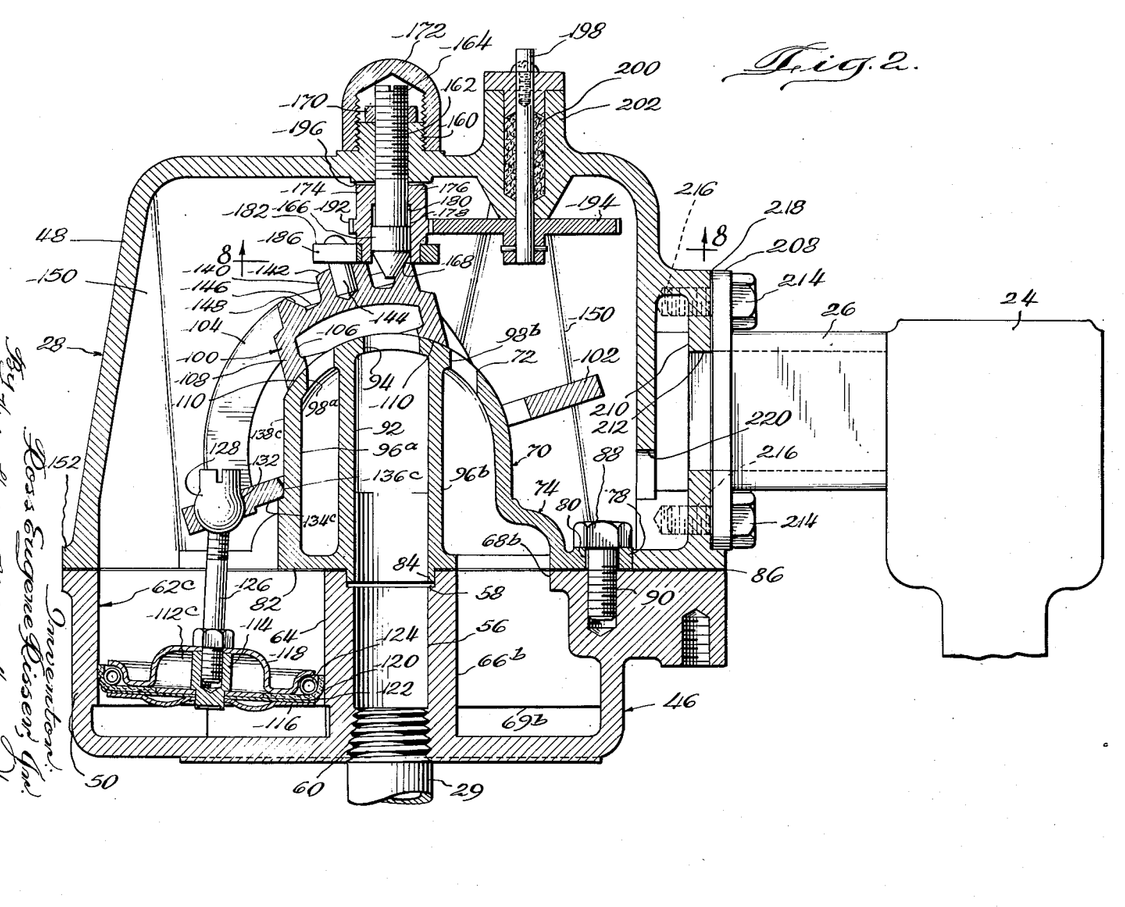
Fig. 2 is a vertical cross-sectional view through the fluid meter which may be considered as taken in the direction indicated by the arrows on the line 2—2 of Fig. 3.
Figure 6:
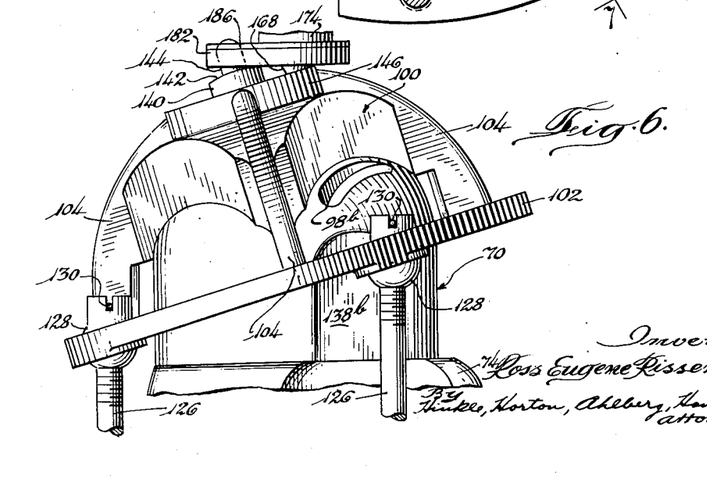
Fig. 6 is a fragmentary view showing the valve seat, valve, valve-operating plate, register drive cam and piston rods.

As an integral part of the top surface of the valve 100, a vertically extending annular boss 140 is formed thereon upon the vertical axis of the valve. This boss has a top surface 142 that arches downwardly slightly from its center, as best seen in Figs. 2 and 6. Also shown in these figures is a follower drive pin 144 which is secured in the boss and projects upwardly therefrom upon the vertical axis of the valve and boss. The upper end of the pin is rounded for a purpose which will be described presently. In addition to the boss and pin the upper surface of the headpiece is also provided with an annular recess 146 cast integrally therewith and concentric with the boss and pin. The inner side walls of this recess taper inwardly and are machined to form a race 148 which is engaged by a part to be described later.

All of the meter operating mechanism just described is enclose within the cover 48 which also provides a support for the register driving mechanism. This cover is generally cylindrical in shape and has gussets 150 cast integrally with its side walls at intervals properly spaced so that the gussets will extend upwardly above the cylinder wells 62a, 62b and 62c in the base. Along its bottom edge the cover is provided with a base flange 152 that seats on the top surface 52 of the housing base 46. The two units are secured together by several cap screws 154 which extend through apertures in the flange 152 and are threaded into tapped openings 158 in the base 46 aligned with the apertures in the flange. Interposed between this base flange and the top surface of the base is the gasket 86 which extends to the edges of the top plate 52 and insures a leak-proof union between the two units of the housing.

Centrally located upon the upper surface of the top wall of the cover 48 is a threaded annular boss 160 which has a tapped vertical bore 162 extending therethrough, and through the top wall, in which the threaded stem of an adjusting pin 164 is secured. On the lower end of this pin is an enlarged head 166 having a conically tapered tip 168. The distance that the tip of the pin 164 extends below the top wall of the housing can, of course, be varied by screwing the pin into the boss 160 to the desired extent and the pin is then locked in position by means of a lock nut 170 threaded on its upper end and bearing against the top of the boss 160. After the pin has been locked in position, a hollow cap 172 is threaded on the boss 160 and completely encloses the end of the pin and the lock nut.

It will be noted in Figs. 2 and 6 that the head 166 of this pin 164 extends into the annular recess 146 on the top of valve 100 to such an extent that the side wall of race 148 will engage the side wall of the tapered tip 168 when the two units of the housing are secured together, the extent of contact between the tip and the walls of the race determining the degree to which the valve and plate may tilt on the seat. By adjusting the pin upwardly the extent of contact between these surfaces is decreased and the tilt of the valve increased, thereby increasing the stroke of the valve, and by adjusting the pin downwardly the extent of contact between the tip and wall of the recess is increased and the stroke of the valve shortened. Since the upper end of the stem of the pin 164 projects above the boss 160 this adjustment can be made without removing the cover of the housing.

Figure 8:
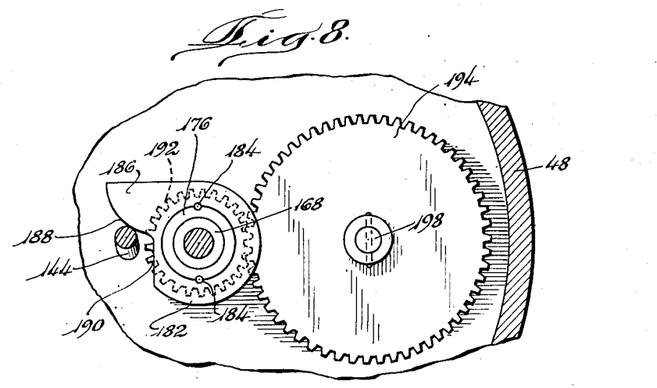
Fig. 8 is a fragmentary sectional view taken on the line 8—8 of Fig. 2 showing the register driving gear train, the drive cam assembly, and the follower drive pin on the distributing valve.

Another function of the pin 164 is to provide a journal for a register driving cam assembly 174 shown in Fig. 2. This assembly comprises a brass hub 176 having an aperture 178 extending therethrough for rotatably securing the hub on the pin and a shoulder 180 in the aperture which engages with the shoulder formed at the base of the head 166 of the pin to prevent the cam assembly from dropping off the pin when the housing cover 48 is lifted from base 46. Secured on the lower reduced end of the hub 176 is a drive cam 182 fixed in position thereon by means of well known drive pins 184, shown in Fig. 8, which also shows the configuration of the cam. It will be seen from this figure that the main disc-shaped body of the cam has a finger 186 that projects tangentially outwardly therefrom and is provided with an inner face 188 arching inwardly from the tip of finger 186 toward the center of the cam to a point where it intersects a plane face 190 on the cam. Spaced upwardly from the cam 182, the hub 176 is also provided with circumferentially extending gear teeth 192 which engage with the teeth on a driven gear 194 on the register driving mechanism for driving the same when the meter is operating.

In the assembled meter the drive cam assembly 174 rotates on the pin 164 but it is supported at the proper elevation in the housing to engage the teeth 192 with the teeth on the driven gear 194 by the curved top surface 142 of the boss 140 on the top of valve 100, as seen in Figs. 2 and 6. The bottom face of the cam 182 rests on this top surface when the cover 48 is in position on the boss 46, while the upper end of hub 176 loosely engages with a boss 196 on the inner surface of the top wall of the cover 48 surrounding the bore 162 which extends through the top wall of the cover.

In the assembled meter the follower drive pin 144 on the valve engages the longitudinally arched vertically curved face 188 of the cam and due to the drag imparted to the drive cam assembly by the driven mechanism a thrust outwardly directed relative to the vertical axis of the valve is exerted by the cam on the pin 144 and valve 100 which tends to maintain the valve in a tilted position on the valve seat 72 at all times so that the tendency of the valve to wobble along a triangular path due to the downwardly directed force exerted by the pistons is overcome, and the two forces in conjunction move the valve in a precession-like manner, the axis of the valve describing a cone. This thrust is sufficient to tilt the valve until the tapered side walls of the race 148 engage the tapered sides of the head 166 of pin 164 and to hold the parts in this position throughout the cycle of operation of the valve. As a result, the valve 100 moves in a precession-like manner on the valve seat 72 throughout its cycle of operation when driven by the pistons and communication between the ports in the valve seat is established in the proper manner to cause the meter to operate and to prevent bypassing any fluid directly from the inlet to the outlet sides of the meter. Under ordinary conditions of operation, the drag imparted to the drive cam assembly 174 by the driven mechanism of the register is sufficient to produce this action at all times so that full stroking of the valve is insured throughout its cycle of operation. In this manner the tendency to short stroke or to follow a triangular path which is a common fault of the valves in meters of this type is overcome.

The driven gear 194 of the register driving mechanism is nonrotatably secured on a spindle 198 which extends vertically upwardly through a packing gland 200 secured in a boss 202 formed in the top of cover 48. A register driving shaft 204 which is in vertical alignment with the spindle 198 is secured to the upper end thereof projecting above the cover by means of a pin and slot type universal joint 206 so that the shaft and spindle rotate together. Thus, when a driving force is exerted on the valve 100 by the pistons and the valve is moved thereby, this movement is transmitted by the pin 144 to the cam 182 which at the same time exerts an outwardly directed thrust on the pin due to the drag in the driven mechanism, as previously explained, so that the pin and valve under the influence of these two forces move in a precession-like manner and the pin engaging the cam causes the cam and cam drive assembly 174 to rotate. As the hub 176 of this assembly rotates it drives the driven gear 194 through the teeth 192 thereon which mesh with the teeth on the driven gear and through this gear and spindle 198 the register drive shaft 204 is rotated. This latter shaft is connected to and drives the mechanism in register 44.

In the operation of the dispensing system, gasoline is forced by the pump 16 into the meter housing 28 through the inlet manifold 26. This manifold has a flange 208 which is secured to an auxiliary inlet chamber 210 cast integrally with the cover of the meter housing 28 and provided with an aperture 212 in its front wall which communicates with the inlet manifold. A plurality of cap screws 214 which pass through apertures in the flange 208 and are threaded into tapped openings 216 in the side walls of chamber 210 are used to secure the manifold to the inlet chamber, a gasket 218 being interposed between the flange 208 and the front wall of the inlet chamber to insure a fluid-tight seal between these parts. From the inlet chamber 210 gasoline flows into the interior of the meter housing 28 through an inlet 220 located adjacent the bottom of the cover 48 so that the gasoline is admitted to the housing at a point immediately above the top surface of the base 46.

As previously explained, the meter is particularly adapted for use in the type of dispensing system which is filled with fluid at all times so that an immediate reduction of pressure occurs throughout the system when gasoline is dispensed from the nozzle 34. Due to the fact that the pump exerts a pressure of approximately twenty pounds per square inch on the gasoline in its outlet chamber, any reduction in pressure such as that produced by opening the valve 40 in nozzle 34 will result in a forward flow of gasoline from the pump to the meter and from the meter to the nozzle in a manner now to be explained.

For the purpose of explaining the operation of the meter, it will be assumed that at the instant gasoline enters the meter housing 28 the pistons 112a and 112c are at the position indicated in Fig. 7, the piston 112a being at the bottom of its stroke in cylinder well 62a and the fulcrum edge 136a on the plate 102 in engagement with the flat surface 138a on the column 70 adjacent its bottom. At this position of the parts, the plate and valve are tilted toward the cylinder 62a and the port 98a in the head is closed by one of the bottom edges 110 of the valve so that the bottom of the cylinder well 62a is not in communication with either the inlet or outlet sides of the meter, but since the top of this well is open, it will be in communication with the incoming gasoline. At this time the piston 112c in cylinder well 62c is approaching the top of its stroke. No driving force will be exerted on it because the cylinder well 62c is in communication with the incoming gasoline on its bottom end through port 98c, duct 96c, port 68c, duct 66c and opening 69c and also on its upper side which opens into the housing. However, cylinder 62b is in communication with the incoming gasoline only on its upper end because the lower end communicates through opening 69b, duct 66b, port 68b, duct 96b and port 98b with the valve chamber 106 and through this chamber with the triangular duct 94 that opens into the communicating discharge passageways 92 and 56. Because the pressure on the bottom side of piston 112b is reduced when gasoline is being dispensed, the pressure of the incoming gasoline on the top side of this piston will force the piston downwardly in the cylinder 62b driving the gasoline on the bottom side of the piston outward through the ducts, ports and discharge passageways previously mentioned, and thence out of the meter into the pipe line 30 and to the nozzle 34. While this is occurring, the piston rod of piston 112b exerts a downward pull on the plate 102 through the ball fitting 128, thus causing the plate to pivot slightly on the fulcrum edge 136b toward cylinder 62b and, as the piston 112b continues to move downwardly, the plate is tilted downwardly over this cylinder. This motion of the plate is imparted to the valve through the arms 104, and under the influence of this force in conjunction with the outward thrust exerted by cam 182 the valve is tilted along the seat 72 to a point where it is tilted downwardly over cylinder 62b. While the plate 102 is tilting toward cylinder 62b, it pulls piston 112c to the top of its stroke and, as the valve tilts toward cylinder 62b, it progressively uncovers port 98a to the incoming gasoline so that both ends of the cylinder well 62a are in communication with incoming gasoline and progressively closes port 98b so that communication between the bottom of cylinder 62b and the discharge side of the meter is gradually cut off and completely closed off when piston 112b reaches the bottom of its stroke.

Concurrently with the above action, communication between the bottom of cylinder 62c and the incoming gasoline is gradually cut off due to the fact that one bottom edge 110 of the valve moves to a position over the port 98c so that this port is completely covered by one of the bottom edges of the valve at the time the piston 112b has completed approximately half of its downward movement, at which time piston 112c is at the top of its stroke. As the piston 112b is completing its downward movement and the plate and valve are tilted progressively toward the cylinder well 62b, port 98c is gradually brought into communication with the chamber 106 in the valve 100 and through it to the discharge side of the meter so that a downward force will be exerted on piston 112c during the next interval in the cycle of operation of the meter.

For a short interval of time after the plate 102 and valve 100 begin to tilt toward cylinder 62b, piston 112a remains stationary and during this interval the bottom of cylinder 62a is brought into communication with the incoming gasoline but further tilting of the plate toward cylinder 62b causes an upward pull to be exerted on the piston rod of piston 112a so that it begins to move upwardly in cylinder well 62a, this movement being unimpeded because the pressure of the gasoline on both sides of the piston is the same. By the time the piston 112b has reached the bottom of its stroke and piston 112c has reached the top of its stroke, piston 112a has been moved upwardly past its dead center position and is approaching the top of its stroke. Thus, the operating mechanism of the meter is in the same relative position as that shown in Fig. 7, but at a point 120 degrees removed in a counterclockwise direction from Fig. 7.

When the mechanism has reached the last position, it will be seen that in the next interval of the cycle of operation of the valve the driving force will be exerted on piston 112c, forcing it down in well 62c and driving the gasoline in the lower part of well 62c out of the meter in the same manner that it was driven from well 62b, as described above. At the same time the plate 102 and valve 100 will be tilted toward cylinder 62c, thus opening port 98b to the incoming gasoline port 98a to the valve chamber 106 and discharge side of the meter and closing port 98c. This tilting of the plate will also cause an upward pull to be exerted on piston 112a to bring it to the top of the stroke and on piston 112b to move it to approximately the top of its stroke so that the meter will be set to go through the last movement of its cycle of operation in which the driving force is exerted on piston 112a.

From the description of the operation of the meter above set forth, it will be observed that the valve and valve operating plate move in a precession-like manner in a counterclockwise direction. It will also be observed that any downward movement of the pistons is due to the fact that the pressure of the incoming gasoline on their upper sides is greater than that of the discharging gasoline on their lower sides and that each upward movement of the pistons occurs when the pressure on both of its sides is equalized due to the fact that the incoming gasoline is in communication with the cylinder well on both sides of the piston. Hence, the volumetric displacement of the meter is not affected by movement of the piston in an upward direction and the meter will register accurately. Furthermore, the discharge side of the meter cannot under any circumstances be brought into direct communication with the incoming gasoline. At all times in a cycle of operation it communicates only with the bottom of a cylinder in which the piston is moving downwardly and at such times this end of the cylinder is not in communication with the incoming gasoline and it will not be brought into communication with this gasoline until a short interval after the piston moving therein has completed its downward stroke.

Having described my invention, what I claim as new and useful and desire to secure by Letters Patent of the United States is:

1. In a fluid meter having a housing enclosing a plurality of pistons reciprocable in cylinders communicating at their upper ends with the interior of the housing and provided with an inlet for fluid under pressure and an outlet for discharging fluid, the combination comprising a valve seat having a discharge outlet and a plurality of ports communicating respectively with the lower ends of said cylinders, a valve movable on said seat, said valve having a spherically curved upper side, register driving mechanism, and means cooperating with said pistons for imparting precession-like movement to said valve to establish the communication aforementioned in a predetermined sequence when fluid under pressure is admitted to said housing including an axially projecting follower fixed to said valve and a cam rotatable upon an axis fixed in said housing for operating said register driving mechanism and axially movable upon said axis, said cam having a follower engaging face convexly outwardly curved relative to the point of driving engagement between said face and follower for imparting an outwardly directed thrust to the valve and a flat side adapted to engage the curved upper side of the valve for maintaining the cam in the plane of movement of said follower.

2. In a fluid meter having a housing enclosing a plurality of pistons reciprocable in cylinders communicating therewith at their upper ends and provided with an inlet for fluid under pressure and an outlet for discharging fluid, the combination comprising a valve for communicating the lower ends of said cylinders with the interior of said housing and with said outlet, register driving mechanism, and means cooperating with said pistons for imparting precession-like movement to said valve to establish the communication aforementioned in a predetermined sequence when fluid under pressure is admitted to said housing, including a cam on said register driving mechanism, cam driving means on said valve, said cam and driving means having surfaces cooperating when in driving engagement to impart an outward thrust to said valve to tilt the same, an annular race on said valve having a face inclined to the race axis, and a rigid pin adapted to be engaged by the inclined face of said race for limiting tilting movement of said valve, said pin having a tip tapered for line contact with said race when the meter is operating.

3. In a fluid meter having a housing enclosing a plurality of pistons reciprocable in cylinders communicating therewith at their upper ends and provided with an inlet for fluid under pressure and an outlet for discharging fluid, the combination comprising a valve for communicating the lower ends of said cylinders with the interior of said housing and with said oulet, register driving mechanism, and means cooperating with said pistons for imparting precession-like movement to said valve to establish the communication aforementioned in a predetermined sequence when fluid under pressure is admitted to said housing, including a cam on said register driving mechanism, cam driving means on said valve, said cam and driving means having surfaces cooperating when in driving engagement to impart an outward thrust to said valve to tilt the same, an annular race on said valve having a face inclined to the race axis, and a rigid pin adapted to be engaged by the inclined face of said race for limiting tilting movement of said valve and having a tip tapered complementary to the angular position of the inclined face side of the race as it moves past said tip, said pin being axially adjustable to vary the extent of contact between said tip and race for thereby varying the angle to which said valve may tilt.

4. In a fluid meter having a housing enclosing a plurality of pistons reciprocable in cylinders communicating therewith at their upper ends and provided with an inlet for fluid under pressure and an outlet for discharging fluid, the combination comprising a valve for communicating the lower ends of said cylinders with the interior of said housing and with said outlet, register driving mechanism, and means cooperating with said pistons for imparting precession-like movement to said valve to establish the communication aforementioned in a predetermined sequence when fluid under pressure is admitted to said housing, including a cam on said register driving mechanism, cam driving means on said valve, said cam and driving means having surfaces cooperating when in driving engagement to impart an outward radial thrust to said valve to tilt the same, an annular race on said valve having a face inclined to the race axis, and a rigid pin adapted to be engaged by the inclined face of said race for limiting tilting movement of said valve, said pin forming a journal for said cam and having a tip tapered complementary to the angular position of the inclined face of the race as it moves past said tip, said pin being axially adjustable to vary the extent of contact between said tip and race for thereby varying the angle to which said valve may tilt.

5. In a fluid meter having a housing enclosing a plurality of pistons reciprocable in cylinder wells formed in a cylinder block and communicating at their upper ends with said housing, the combination comprising a tubular column extending upwardly relative to said cylinder wells and having a semi-spherical valve seat formed thereon with a discharge outlet duct and a plurality of ports connected respectively to the lower ends of said cylinders, a valve on said seat for controlling communication through said ports and discharge outlet, an operating member connected to said valve and pistons and surrounding said column, means forming inwardly projecting fulcrums on said operating member opposite the place of connection of said pistons thereto, said column having surface areas extending above said cylinders upon which said fulcrum forming means are adapted to engage for limiting movement of said operating member under the influence of said pistons and thereby positively cutting off the stroke of the pistons.

6. In a fluid meter having a housing enclosing a plurality of pistons reciprocable in cylinder wells formed in a cylinder block and communicating at their upper ends with said housing, the combination comprising a tubular column extending upwardly relative to said cylinder wells and having a semi-spherical valve seat formed thereon with a discharge outlet duct and a plurality of ports connected respectively to the lower ends of said cylinders, said tubular member having external chordal plane surface areas extending axially upwardly above said cylinders, a valve on said seat for controlling communication through said ports and discharge outlet, means for operatively connecting said valve and pistons including an annular member encompassing said column, and means forming inwardly projecting chordally extending fulcrums on said annular member opposite the plane surface areas on said column adapted to engage the same for limiting movement of said annular member under the influence of said piston and thereby limiting the stroke of the piston.

7. In a fluid meter having a housing enclosing a plurality of pistons reciprocable in cylinder wells formed in a cylinder block and communicating at their upper ends with said housing, the combination comprising a tubular column extending upwardly relative to said cylinder wells and having a semispherical valve seat formed thereon with a discharge outlet duct and a plurality of ports connected respectively to the lower ends of said cylinders, said tubular member having external chordal plane surface areas extending axially upwardly above said cylinders, a valve on said seat for controlling communication through said ports and discharge outlet, an operating member connected to said valve and pistons and encompassing said column, and means forming inwardly projecting abutments on said operating member having inwardly facing fulcrum edges opposite the plane surface areas on said column adapted to engage the same for limiting movement of the said operating member under the influence of said pistons and thereby limiting the stroke of the same, said fulcrum edges being spaced sufficiently from said plane surface areas to allow said valve and operating member freedom for limited pivotal movement between the limits of said piston stroke whereby the path of travel of said valve on said seat may vary slightly from time to time.

8. In a fluid flow meter having a plurality of pistons reciprocable in measuring cylinders distributed around a central axis and a valve operable by the pistons for directing the flow of fluid through the meter to move the pistons sequentially, the valve including a valve seat and a valve slider connected with the pistons for precession-like movement on the seat, the axis of the valve slider describing a generally conical path about the central axis, the improvement which comprises providing a register driving cam mounted for rotation about the central axis of the meter, and a cam driving projection on the valve slider extending toward the cam along the axis of the slider, the cam having a camming surface for engaging the projection, the surface being sloped outwardly with respect to the central axis and recedingly with respect to the projection to provide an outward thrust reaction component upon the projection for urging the valve slider toward tilted position with respect to the central axis.

9. In a fluid flow meter having a plurality of pistons reciprocable in measuring cylinders distributed around a central axis and a valve operable by the pistons for directing the flow of fluid through the meter to move the pistons sequentially, the valve including a valve seat and a valve slider connected with the pistons for precession-like movement on the seat, the axis of the valve slider describing a generally conical path about the central axis, the improvement which comprises providing a register driving cam mounted for rotation about the central axis of the meter, and a cam driving projection on the valve slider extending toward the cam along the axis of the slider, the cam having a curved camming surface for engaging the projection, the surface being arched outwardly with respect to the central axis and away from the projection to provide an outward thrust reaction component upon the projection for urging the valve slider toward tilted position with respect to the central axis.

10. In a fluid flow meter having a plurality of pistons reciprocable in measuring cylinders distributed around a central axis and a valve operable by the pistons for directing the flow of fluid through the meter to move the pistons sequentially, the valve including a valve seat and a valve slider connected with the pistons for precession-like movement on the seat, the axis of the valve slider describing a generally conical path about the central axis, the improvement which comprises providing a register driving cam mounted for rotation about the central axis of the meter, and a cam driving pin on the valve slider projecting toward the cam along the axis of the slider, the pin having a rounded tip, the cam having a curved camming surface for engaging the pin, the surface being arched outwardly with respect to the central axis and away from the pin to provide an outward thrust reaction component upon the pin for urging the valve slider toward tilted position with respect to the central axis.

R. EUGENE RISSER, Jr.

REFERENCES CITED

The following references are of record in the file of this patent:

UNITED STATES PATENTS

| Number | Name | Date |
|---|---|---|
| 575,991 | Schonheyder | Jan. 26, 1897 |
| 2,021,882 | Bechtold | Nov. 26, 1935 |

FOREIGN PATENTS

| Number | Country | Date |
|---|---|---|
| 373,933 | Great Britain | June 2, 1932 |